United States Patent
Santori et al.

(10) Patent No.: US 8,179,935 B2
(45) Date of Patent: May 15, 2012

(54) TUNABLE OPTICAL RESONATOR

(75) Inventors: Charles Santori, Palo Alto, CA (US); Duncan Stewart, Menlo Park, CA (US); Robert G Walmsley, Palo Alto, CA (US); Sagi Mathai, Palo Alto, CA (US); Marco Fiorentino, Mountain View, CA (US); David Fattal, Mountain View, CA (US); Qianfan Xu, Mountain View, CA (US); Raymond Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 642 days.

(21) Appl. No.: 12/263,405

(22) Filed: Oct. 31, 2008

(65) Prior Publication Data
US 2009/0245296 A1 Oct. 1, 2009

Related U.S. Application Data

(60) Provisional application No. 61/041,315, filed on Apr. 1, 2008.

(51) Int. Cl.
*H01S 3/04* (2006.01)
*H01S 3/10* (2006.01)
*H01S 3/083* (2006.01)

(52) U.S. Cl. ............... 372/34; 372/20; 372/94; 359/346
(58) Field of Classification Search ............... 359/346; 372/20, 34, 94
See application file for complete search history.

(56) References Cited

U.S. PATENT DOCUMENTS

| | | | |
|---|---|---|---|
| 5,513,200 A * | 4/1996 | Paoli ................... | 372/50.122 |
| 5,926,496 A * | 7/1999 | Ho et al. ................ | 372/92 |
| 6,396,854 B1 * | 5/2002 | Takagi .................. | 372/20 |
| 6,541,295 B1 * | 4/2003 | Looney ................. | 438/29 |
| 6,891,865 B1 * | 5/2005 | Ma ....................... | 372/20 |
| 7,174,064 B2 * | 2/2007 | Sayyah et al. ......... | 385/15 |
| 2002/0172466 A1 * | 11/2002 | Baumann et al. ...... | 385/50 |
| 2005/0013538 A1 * | 1/2005 | Yamazaki .............. | 385/27 |
| 2005/0169582 A1 * | 8/2005 | Tan et al. ............... | 385/50 |
| 2007/0292075 A1 | 12/2007 | Montgomery et al. | |

FOREIGN PATENT DOCUMENTS

GB 873786 7/1961
WO 2007146233 A2 12/2007

* cited by examiner

*Primary Examiner* — Eric Bolda

(57) ABSTRACT

An optical apparatus includes a substrate comprising a layer of thermally insulating material disposed thereon; an optical resonator disposed on the layer of thermally insulating material; and a trench in the thermally insulating material disposed around at least a portion of the optical resonator. The optical resonator is substantially thermally isolated from the substrate.

20 Claims, 10 Drawing Sheets

```
                    ┌──────────────────────────────────┐
                    │ Provide a substantially thermally │
                    │ isolated optical resonator having │
                    │ an optical waveguide              │
                    │ arranged in a loop          1001  │
                    └──────────────────────────────────┘
                                    │
                                    ▼
                    ┌──────────────────────────────────┐
                    │      Provide a heating element    │
                    │                             1003  │
                    └──────────────────────────────────┘
                                    │
                                    ▼
                    ┌──────────────────────────────────┐
                    │ Selectively alter the resonant    │
                    │ frequency of the optical resonator│
                    │ using heat generated from         │
                    │ the heating element         1005  │
                    └──────────────────────────────────┘
```

*Fig. 10*

TUNABLE OPTICAL RESONATOR

CROSS-REFERENCE TO RELATED APPLICATION

The present application claims priority from provisional application Ser. No. 61/041,315, filed Apr. 1, 2008, the contents of which are incorporated herein by reference in their entirety.

BACKGROUND

Light beams or optical signals are frequently used to transmit digital data, for example, in fiber optic systems for long-distance telephony and internet communication. Additionally, much research has been done regarding the use of optical signals to transmit data between electronic components on circuit boards.

Consequently, optical technology plays a significant role in modern telecommunications and data communication. Examples of optical components used in such systems include optical or light sources such as light emitting diodes and lasers, waveguides, fiber optics, lenses and other optics, photo-detectors and other optical sensors, optically-sensitive semiconductors, optical modulators, and others.

Systems making use of optical components often rely upon the precise manipulation of optical energy, such as a beam of light, to accomplish a desired task. This is especially true in systems utilizing light for high-speed, low-energy communication between two nodes. Often optical resonators are used to selectively filter, switch, or modulate light beams.

When light of the appropriate wavelength is introduced into the resonator, the light beam builds up in intensity due to constructive interference. Alternatively, light of a wavelength apart from the resonant frequency or range of the resonator is attenuated by destructive interference.

Optical resonators are often used to modulate data onto optical beams by varying the resonant frequency. This can be done by altering an effective index of refraction of the resonator, therefore causing a shift in the resonant frequency of the ring resonator. The index of refraction can be shifted by altering a free carrier concentration within the resonator (i.e. selectively injecting or removing charge carriers) or by altering the temperature of the resonator. Often it is desirable to maintain the resonator at a constant temperature while modulating the data onto the optical beam by selectively injecting and removing charge carriers. The temperature at which the resonator is maintained may be determined by a base resonant frequency at which it is desired that the resonator operate.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 10 is a flowchart diagram of an illustrative method of tuning a ring resonator according to one embodiment of the principles described herein.

Throughout the drawings, identical reference numbers designate similar, but not necessarily identical, elements.

DETAILED DESCRIPTION

Figure 1:
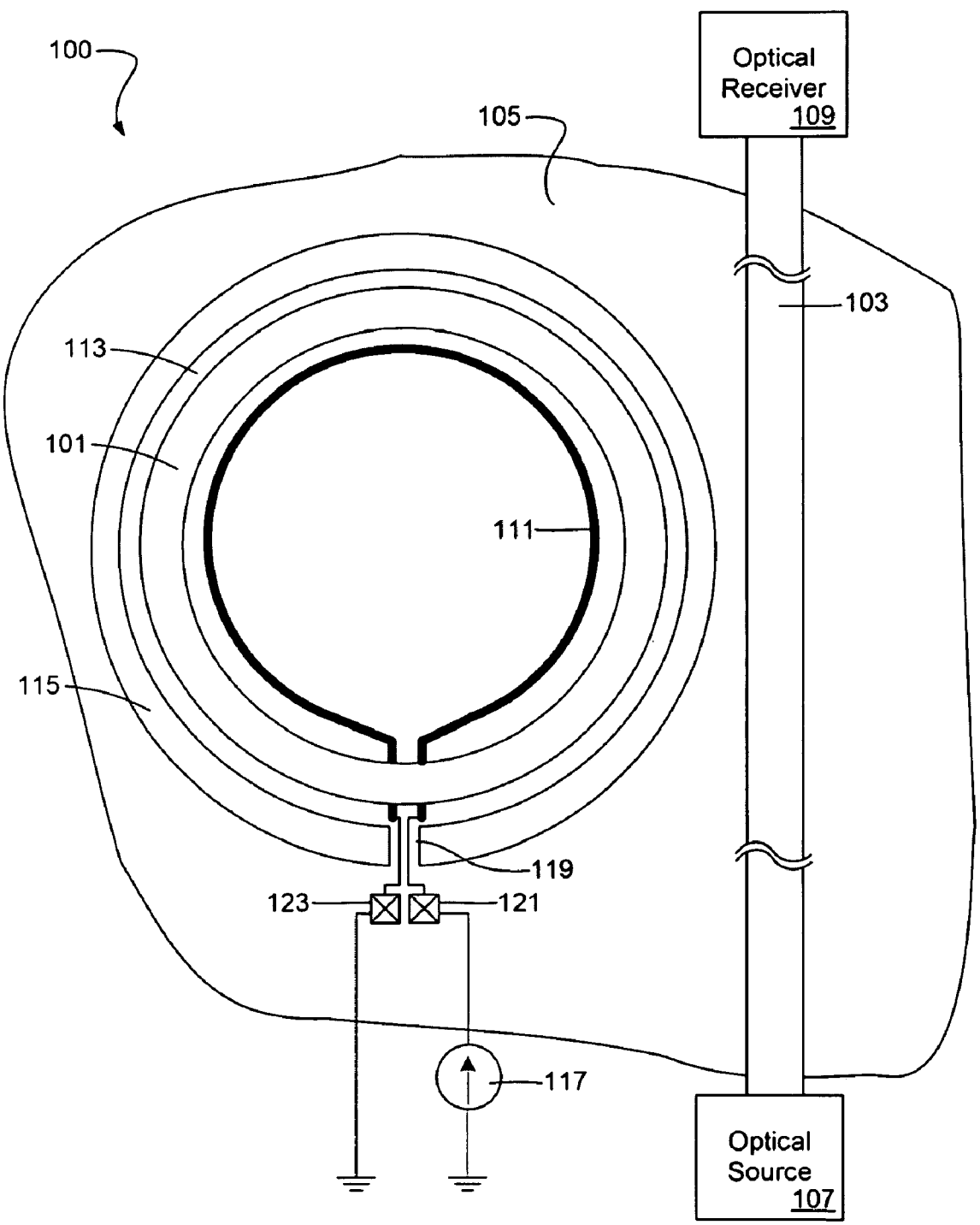
FIG. 1 is a diagram of an illustrative ring resonator according to one embodiment of the principles described herein.

As described above, optical resonators may be used in many different optical devices. Optical resonators have a characteristic resonant frequency, which requires selective tuning in some systems.

The resonant frequency in an optical resonator may be adjusted by selectively heating or cooling the resonator, thus altering the operating temperature of the resonator. It may be desirable, therefore, to accurately control the temperature of an optical resonator to precisely tune the resonator to a desired resonant frequency and to minimize power consumption of any temperature altering device employed.

To accomplish these and other goals, the present specification discloses an optical apparatus in which an optical resonator is disposed on a layer of thermally insulating material on a substrate. A trench in the thermally insulating material is disposed around the optical resonator, and the optical resonator is substantially thermally isolated from the substrate.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims when referring optical waveguides, the term "connected" refers to the physical proximity and orientation of at least two optically conductive objects such that an appreciable optical signal through one of the objects is at least partially received in another of the objects.

As used in the present specification and in the appended claims, the term "optical source" refers to a device from which optical energy originates. Examples of optical sources as thus defined include, but are not limited to, light emitting diodes, lasers, light bulbs, and lamps.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods involving ring resonators. However, it will be understood that the principles are not limited only to applications using ring resonators. Rather, they principles described herein may be applied broadly to a wide range of optical resonators, including, but not limited to, ring resonators, optical microrings, optical microdisks, and photonic crystal microcavities.

Illustrative Systems

Referring now to FIG. 1, a diagram of an illustrative optical resonator (100) is shown. The optical resonator (100) may have a first optical waveguide arranged in a loop to form a resonant ring (101). A second, tangential optical waveguide (103) may be tangentially connected to the resonant ring (101). In certain embodiments, this tangential connection may include the overlap of corresponding evanescent regions in the resonant ring (101) and the tangential waveguide (103). The overlap of corresponding evanescent regions may allow optical energy traveling through the tangential waveguide (103) to be coupled to and travel through the resonant ring (101), even though the waveguides of the resonant ring (101) and tangential waveguide (103) may not actually be coupled mechanically The resonant ring (101) and the tangential waveguide (103) may be fabricated out of semiconductor materials, such as silicon, gallium arsenide, germanium, and the like. Furthermore, the resonant ring (101) and the tangential waveguide (103) may be fabricated on a substrate (105), such as silicon dioxide. In some embodiments, the substrate (105) may include a plurality of different regions. For example, the substrate (105) may include one or more insulating layers (e.g. silicon dioxide layers and the like), air gaps, trenches, metal layers, metal contacts, metal vias, doped regions of semiconductor material, and the like.

The resonant ring (101) will have a resonant frequency, which may be at least partially determined by the cross-sectional dimensions of the resonant ring (101) and the tangential waveguide (103), the ring dimensions of the resonant ring (101), electrical charges, the material of which the resonant ring (101) and tangential waveguide (103) are fabricated, and operating temperature of the optical resonator (100). The optical resonator (100) may be configured to sustain optical energy having a wavelength characteristic of the resonant frequency or a range of wavelengths above and below the resonant frequency. All other optical energy may be attenuated or suppressed by destructive interference.

Optical energy may be generated by an optical source (107), such as a laser or a light emitting diode (LED) and enter the resonator (100) through a first end of the tangential waveguide (103). Optical energy having the correct wavelength (i.e. at or near the resonant frequency of the resonant ring (101)) may enter the resonant ring (101) at the tangential optical junction of the ring (101) and the tangential waveguide (103) and resonate through the loop of the resonant ring (101). Optical energy of other wavelengths may be dissipated through destructive interference and the intrinsic losses of the ring (101). The optical signals which are resonant with the ring (101) may then be transmitted through the tangential waveguide (103) to an optical receiver (109) disposed at a second end of the tangential waveguide (103), such as a photodiode or another waveguide. Consequently, the optical resonator (100) may be used to modulate the intensity of a particular wavelength of optical energy by moving in and out of resonance with light of a given frequency.

The optical resonator (100) may include a heating element (111) configured to heat the resonant ring (101) through resistive heat generated by passing as an electric current through the heating element (111). This resistive heat may be dissipated to the resonant ring (101) and reduce the resonant frequency of the optical resonator (100). Therefore, the resonant frequency of the optical resonator (100) may be reduced by selectively increasing the amount of electrical current flowing through the heating element (111). By decreasing the amount of current that flows through the heating element (111), less heat may be generated by the resistance of the material of the heating element (111), and the operating temperature of the optical resonator (100) may decrease, thus increasing the resonant frequency of the optical resonator (100).

The heating element (111) may include an electrical coil. For example, the heating element (111) may include a coil of an electrically conducting material, such as a metal, a metal alloy, or polysilicon. Heat may be generated by the intrinsic resistance of the material of the heating element (111) as a current is passed through the heating element (111). In the present example, the heating element (111) has a single turn of an electrically conductive material. However, electrical coils having multiple turns of electrically conductive material may be used in other embodiments. In certain embodiments, the heating element (111) may include a plurality of separate electrical coils. The heating element (111) may be substantially concentric with the resonant ring (101) and physically disposed substantially adjacent to the resonant ring (101).

The resonant ring (101) and the heating element (111) may be disposed on an island (113) of semiconductor material that is substantially thermally isolated from the substrate (105) and any other devices, layers, or other structures fabricated on the substrate (105). This thermal isolation may be at least partially achieved by one or more etched and undercut groove (115) disposed around and underneath the island (113). The groove (115) may be filled with air or another thermally insulating material (e.g. porous silicon dioxide or silicon nitride) to prevent temperature fluctuations in the substrate (105) from affecting the operating temperature of the resonant ring (101). A thermally insulating post (not shown) may anchor the island (113) to the substrate (105) as will be explained in more detail below.

Providing a substantially thermally isolated environment for the resonant ring (101) may result in substantial benefits in performance and power consumption of the optical resonator. For example, in a substantially thermally isolated environment, the temperature of the resonant ring (101) may be more precisely controlled due to the very low thermal conductivity between the island (113) and the substrate (105), thus preventing heat generated by the heating element (111) from leaking to the substrate (105).

Furthermore, the power needed to heat the resonant ring (101) may be proportional to the temperature differential between the resonant ring (101) and the substrate (105), as well as the thermal conductance of the structure connecting the resonant ring (101) to the substrate (105). Therefore, by reducing the thermal conductance of the material connecting the resonant ring (101) to the substrate (105) and by surrounding the island (113) with air or another insulator, less thermal energy may be required from the heating element (111) to achieve a desired temperature increase in the resonant ring (101), thus conserving power consumption in the heating element (111).

Additionally, due to the smaller surface area of the island (113), selective changes in the electrical current through the heating element (111) may allow for faster heating and cooling of the resonant ring (101).

In embodiments where two or more neighboring resonant rings (101) coexist, each of the resonant rings (101) may be fabricated on a separate, thermally isolated island (113). In this way, thermal cross-talk between the resonant rings (101) may be reduced as each of the resonant rings (101) is tuned according to the needs of a particular application.

A current source (117) may be in electrical communication with one end of the heating element (111). Therefore, the operating temperature, and by extension the resonant frequency, of the resonant ring (101) may be selectively altered by selectively altering the amount of current provided to the heating element (111) by the current source (117).

Electrical current generated by the current source (117) may enter the heating element (111) at one end and exit the electrical coil to ground or another common electrical node per the requirements of the individual system utilizing the optical resonator (100). In certain embodiments, a bridge (119) between the island (113) and the bulk of the substrate (105) may be provided to allow electrical communication between the heating element (111) and the current source (117) and/or ground. The bridge (119) may provide electrical connectivity between the heating element (111) and pads (121, 123) or other nodes on the substrate (105) that may then connect to the current source (117) and ground.

In some embodiments, in addition to providing electrical connectivity between the heating element (111) and the substrate (105), the bridge (119) may be used to provide electrical connectivity to a modulator configured to selectively inject and remove electric charge from the resonant ring (101) to encode digital data on to optical energy propagating through the resonant ring (101) and the tangential waveguide (103).

In some embodiments, an ideal case may be reached where the required heating power to tune the resonant ring (101) is similar to an amount of heat dissipated by a modulating element used in conjunction with the resonant ring (101). For example, the heat generated by selectively switching on and off a current flowing through an n-i-p or other junction as optical data is modulated in the resonant ring (101) may be approximately equivalent to the amount of heat needed to maintain the resonant ring (101) at a desired base resonant frequency. In such embodiments, a standalone heating element (111) may not necessarily be used to heat the resonant ring (101), as the modulating element may also function as a heating element to tune the resonant ring (101) to a desired resonant frequency.

Figure 2:
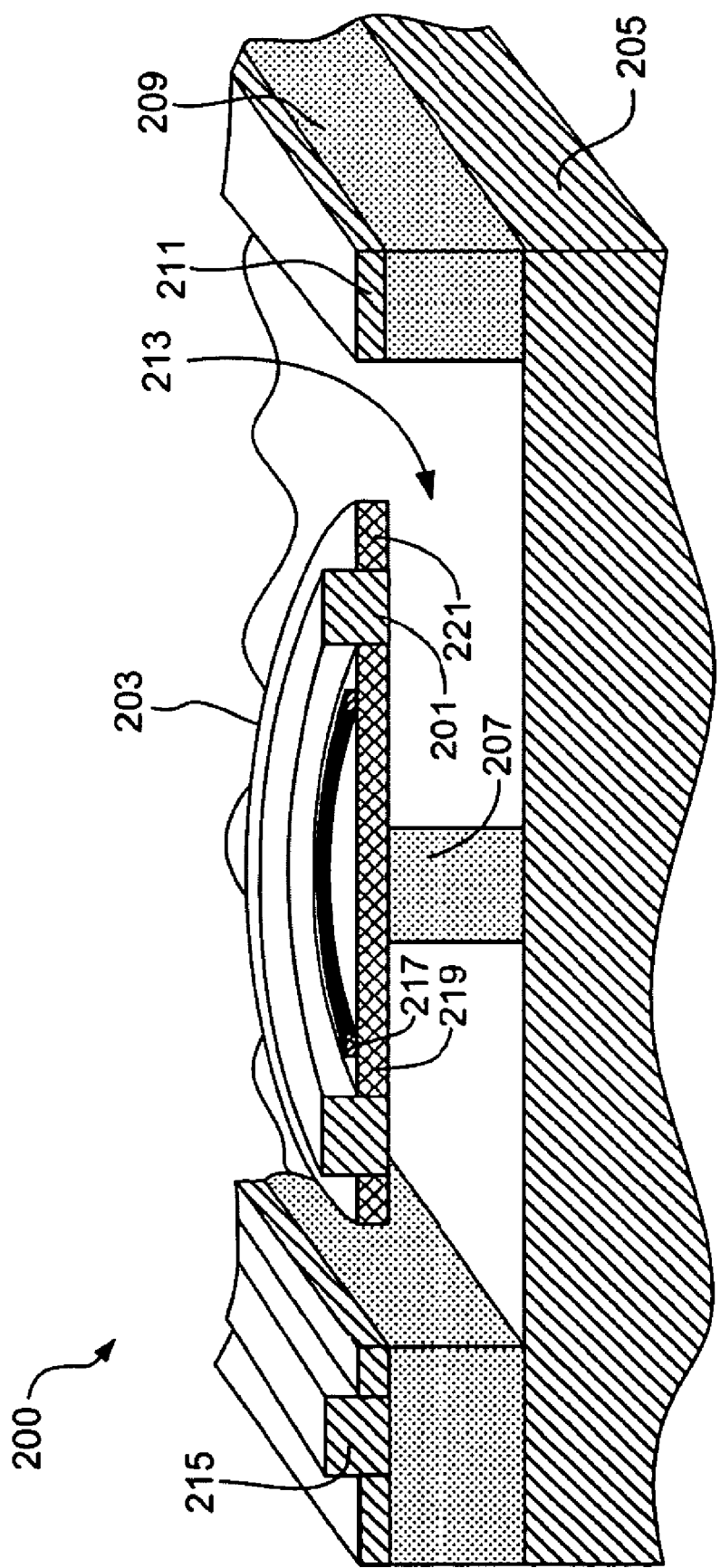
FIG. 2 is a cross-sectional diagram of an illustrative ring resonator according to one embodiment of the principles described herein.

Referring now to FIG. 2, a cross-sectional view of an illustrative optical resonator (200) is shown. The optical resonator (200) includes a first optical waveguide formed into a resonant ring (201) disposed on a semiconductor island (203). The semiconductor island (203) may be connected to a thermally insulating post (207). The thermally insulating post (207) may include a material with a low thermal conductivity, such as silicon dioxide or silicon nitride. In certain embodiments, the material of the thermally insulating post (207) may be porous for added thermal insulation. The thermally insulating post (207) may anchor the semiconductor island (203) to the substrate (205), while substantially isolating the island (203) thermally from the substrate (205).

In the present example, the substrate (205) may include an oxide layer (209) and a layer of semiconductor material (211) disposed on the oxide layer (209). A tangential waveguide (215) may be fabricated on the layer of semiconductor material (211) and optically coupled to the resonant ring (201).

Through selective etching and undercutting, a groove (213) may be provided in the oxide layer (209) and the layer of semiconductor material (211) to form the island (203) and the thermally insulating post (207). The groove (213) may also provide space around the island (203) that serves to substantially isolate the island (203) from the rest of the substrate (205).

A heating element (217) may be disposed on the island (203) concentric with the resonant ring (201) and configured to selectively alter the resonant frequency of the resonant ring (201) according to an electrical current passed through the heating element (217), as explained above. The heating element (217) may include a ring or coil of electrically conducting material, such as a metal or polysilicon. Furthermore, portions (219, 221) of the island (203) may be doped with impurities to allow for the selective injection and removal of electric charge in the resonant ring (201) to encode data onto optical energy propagating through the tangential waveguide (215) and the resonant ring (201).

Figure 3:
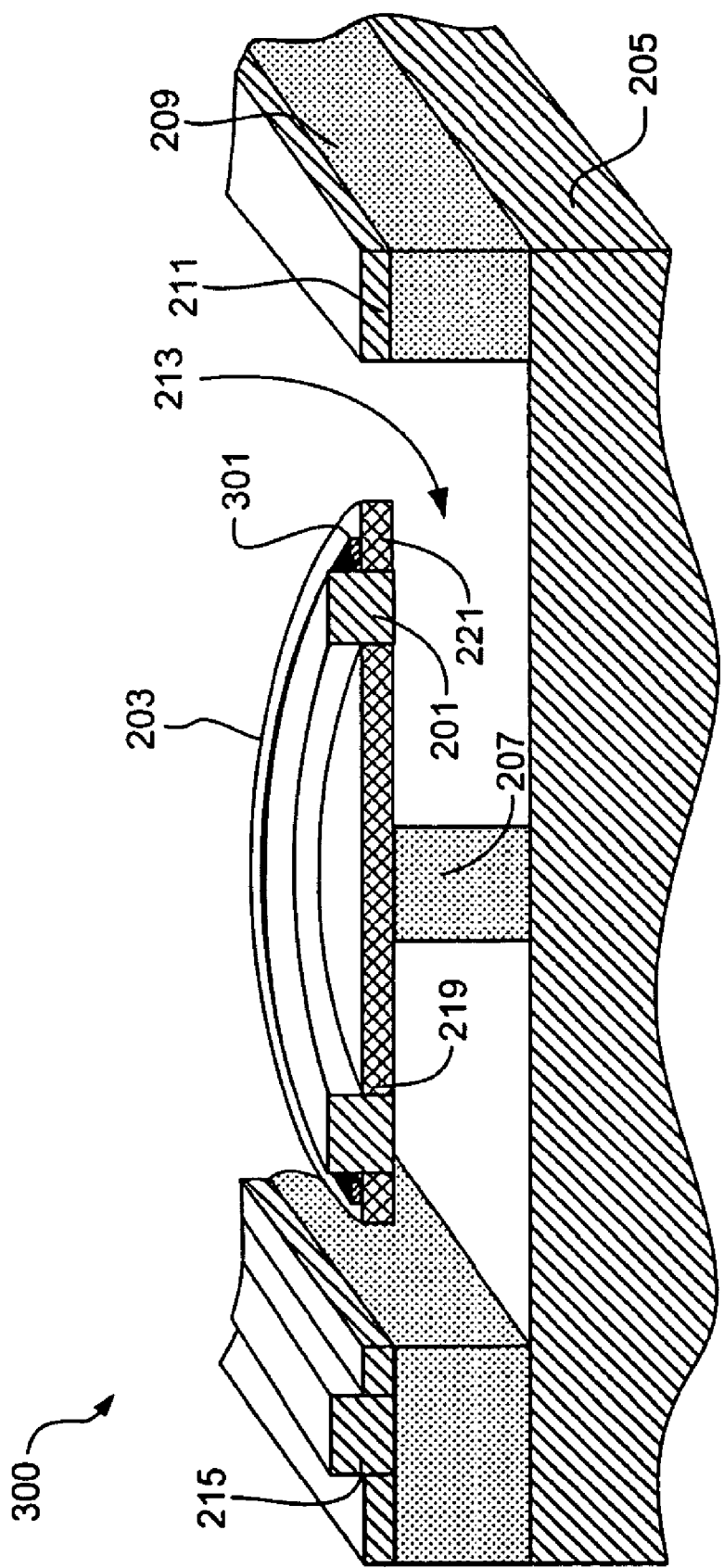
FIG. 3 is a cross-sectional diagram of an illustrative ring resonator according to one embodiment of the principles described herein.

Referring now to FIG. 3, a cross-sectional view of another illustrative optical resonator (300) is shown. The illustrative optical resonator (300) has a substantially thermally isolated resonant ring (201) disposed on an island (203) and tangential waveguide (215) similar to those of the optical resonator (200, FIG. 2) shown in FIG. 2. The present illustrative optical resonator (300) also has a heating element (301) configured to selectively heat the resonant ring (201) to selectively tune the resonant frequency of the optical resonator (300) in accordance with principles described previously. Like the heating element (217, FIG. 2) shown in FIG. 2, the present heating element (301) may be disposed on the island (203) concentric to the resonant ring (201). Unlike the heating element (217, FIG. 2) shown in FIG. 2, however, the present heating element (301) may be disposed substantially adjacent to the outer circumference of the resonant ring (201).

Figure 4:
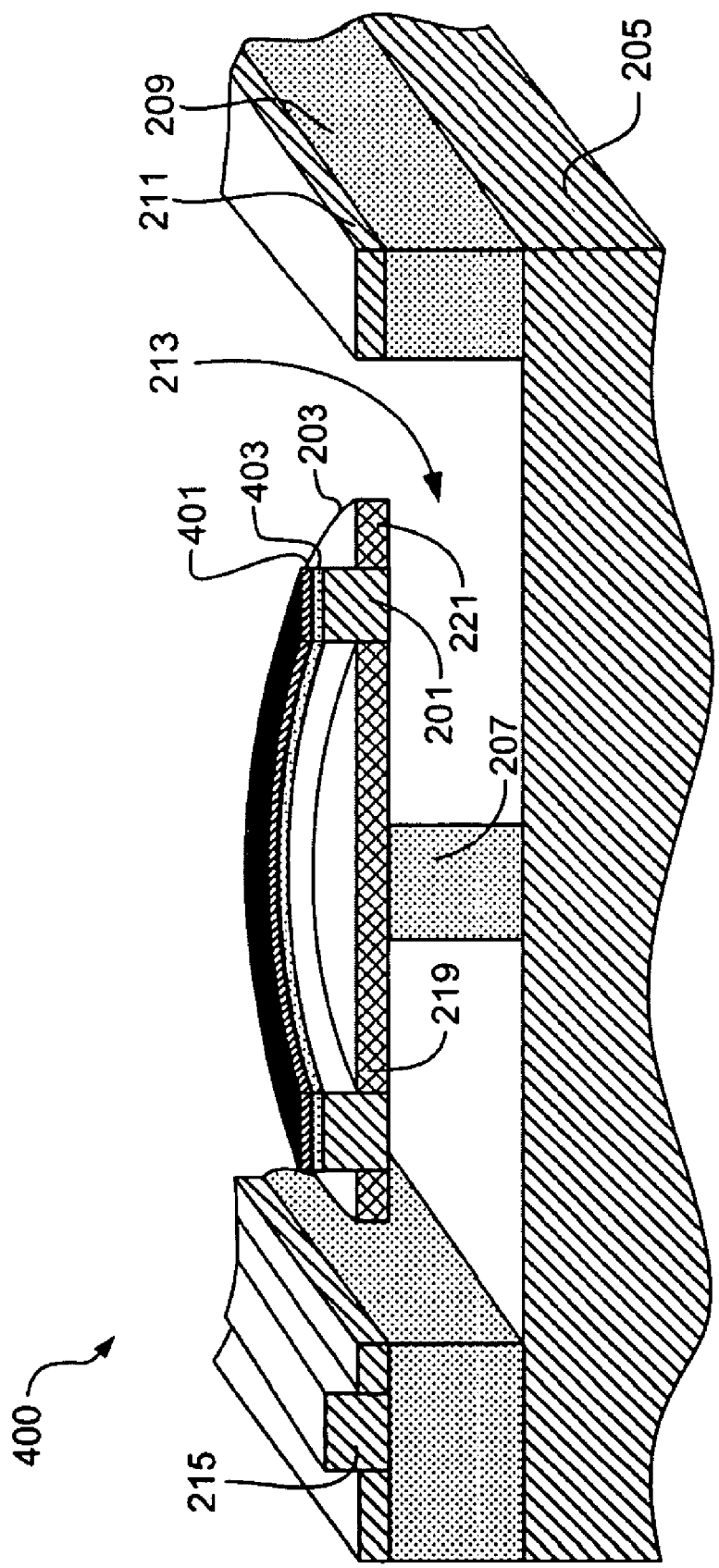
FIG. 4 is a cross-sectional diagram of an illustrative ring resonator according to one embodiment of the principles described herein.

Referring now to FIG. 4, a cross-sectional view of another illustrative optical resonator (400) is shown. The illustrative optical resonator (400) has a substantially thermally isolated resonant ring (201) disposed on a semiconductor island (203), and a tangential waveguide (215) similar to those of the previously described embodiments. A heating element (401) is disposed over the resonant ring (201) to selectively tune the optical resonator (400) in accordance with principles described previously. A thin layer of electrically insulating material (403), such as silicon dioxide or silicon nitride, may be disposed between the heating element (401) and the resonant ring (201) to prevent current leakage between the heating element (401) and the resonant ring (201). The layer of electrically insulating material (403) may be thick enough to allow sufficient electrical insulation between the heating element (401) and the resonant ring (201) without significantly impeding the transfer of heat from the heating element (401) to the resonant ring (201).

Figure 5:
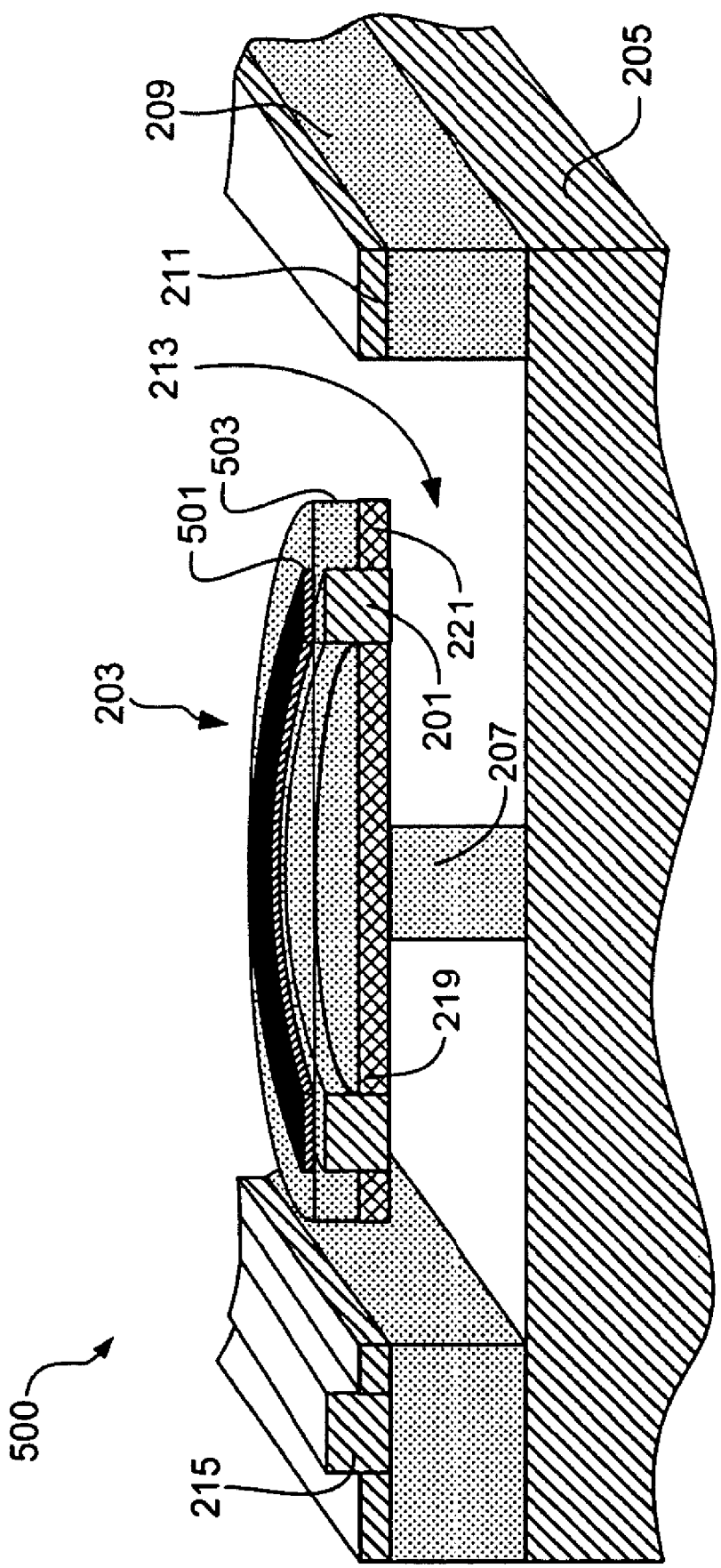
FIG. 5 is a cross-sectional diagram of an illustrative ring resonator according to one embodiment of the principles described herein.

Referring now to FIG. 5, a cross-sectional view of another illustrative optical resonator (500) is shown. The illustrative optical resonator (500) has a heating element (501) disposed over the resonant ring (201) similar to the optical resonator (400, FIG. 4) shown in FIG. 4. In the present example, an insulating layer (503) is disposed over the entire surface area of the island (203) to further protect and isolate the island (203) and its resonant ring (201). The heating element (501) may be disposed over the insulating layer (503) such that thickness of the insulating layer (503) between the heating element (501) and the resonant ring (201) is small enough to still allow substantial heat transfer from the heating element (501) to the resonant ring (201) to selectively tune the resonant frequency of the optical resonator (500).

Figure 6:
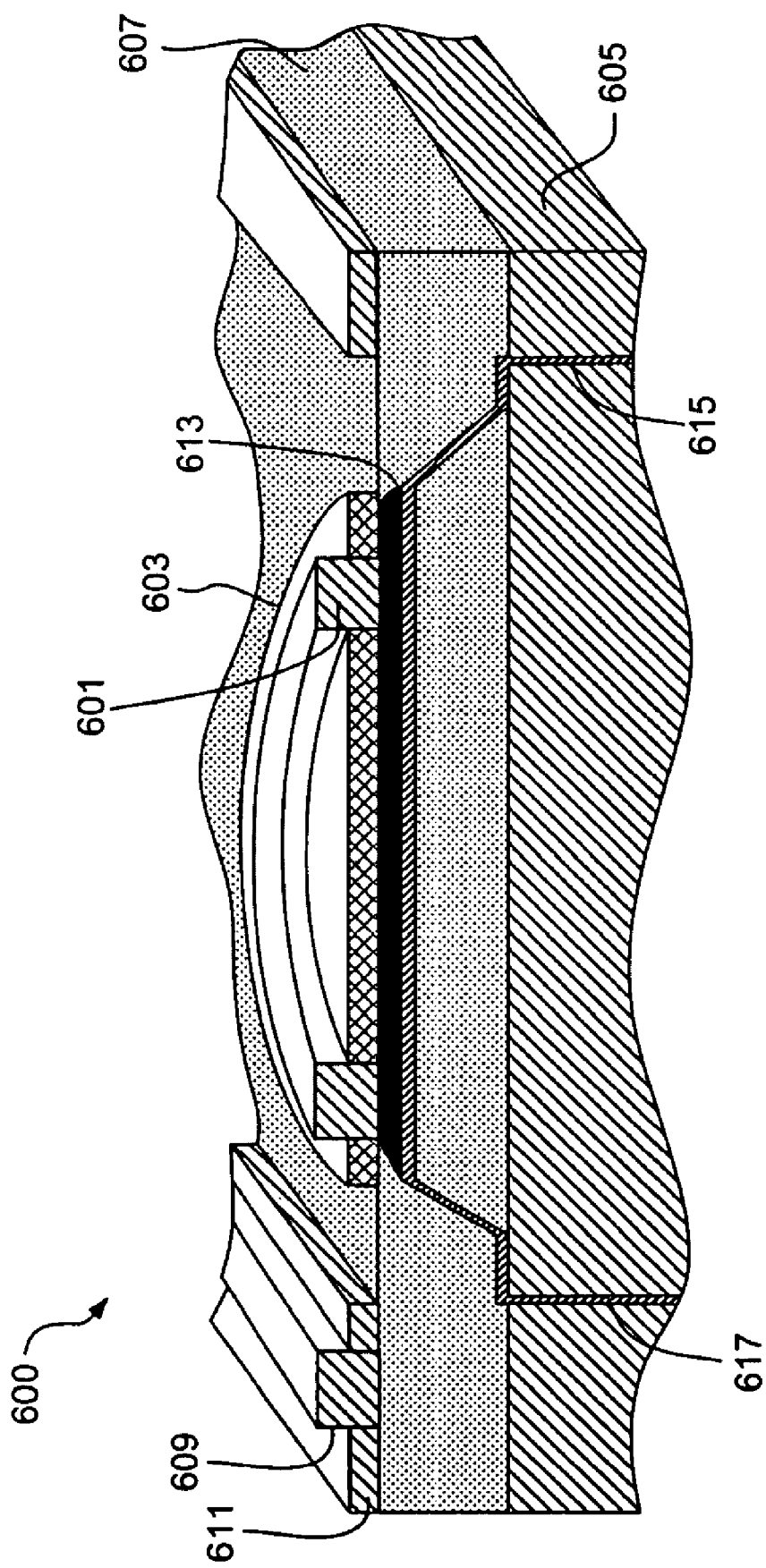
FIG. 6 is a cross-sectional diagram of an illustrative ring resonator according to one embodiment of the principles described herein.

Referring now to FIG. 6, a cross-sectional view of another illustrative optical resonator (600) is shown. The illustrative optical resonator may include a resonant ring (601) fabricated on a substantially isolated semiconductor island (603). The semiconductor island (603) may be substantially isolated from a substrate (605) by a thermally and electrically insulating layer (607) fabricated on the substrate (605). A tangential waveguide (609) may be fabricated on a separate semiconductor island (611) and positioned such that the tangential waveguide (609) is optically connected to the resonant ring (601) as described in previous embodiments.

A heating element (613) may be disposed within the insulating layer (607) beneath the resonant ring (601) at a distance that allows the heating element (613) to selectively heat the resonant ring (601) while maintaining electrical isolation from the resonant ring (601) and its corresponding semiconductor island (603). The heating element (613) may be electrically connected to electrical components fabricated on or within the substrate (605) through vias (615, 617) or other electrical interconnects.

Figure 7A:
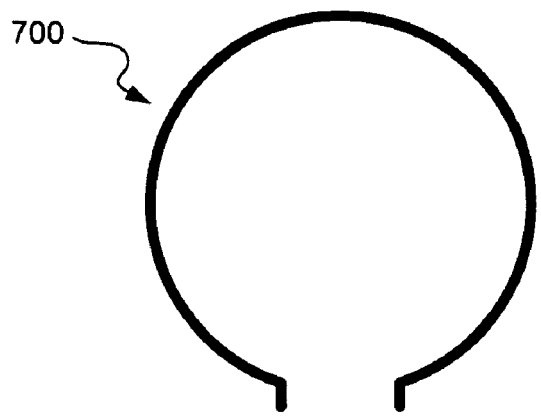
FIGS. 7A-7C are diagrams of illustrative heating elements for a ring resonator according to embodiments of the principles described herein.
Figure 7B:
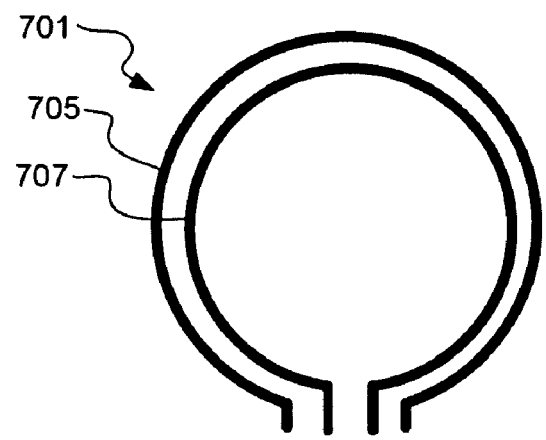
Figure 7C:
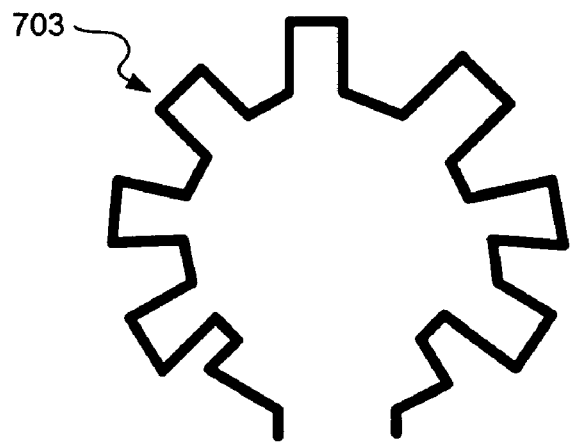

Referring now to FIGS. 7A-7C, illustrative embodiments are shown of heating elements (700, 701, 703) that may be used to tune optical resonators consistent with the principles of the present specification.

The heating element (700) shown in FIG. 7A has a single-turn electrical coil. The heating element (701) shown in FIG. 7B has two concentric single-turn electrical coils (705, 707). The heating element (703) of FIG. 7C has a single-turn electrical coil with a substantially meandering electrical path configured to increase the length of the heating element (703) and therefore increase its resistance.

Figure 8:
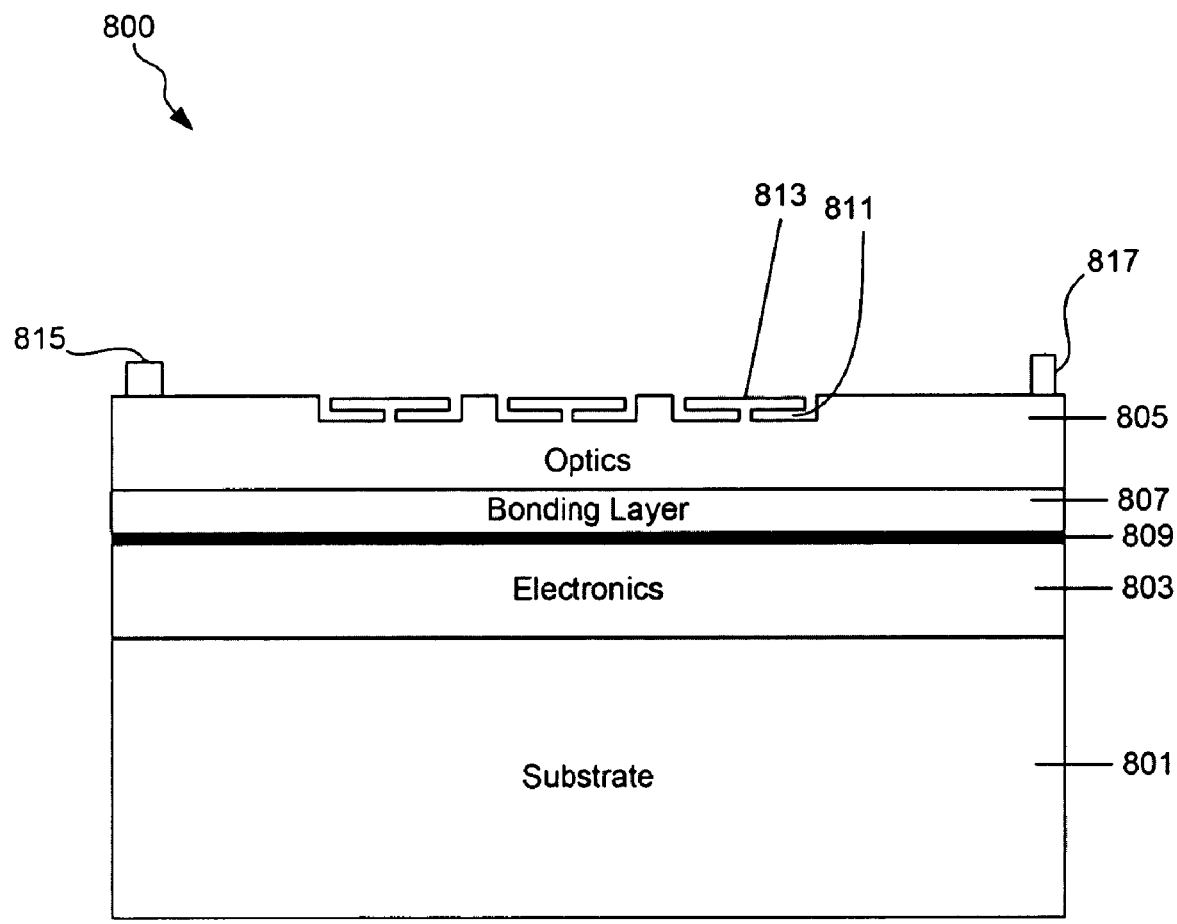
FIG. 8 is a cross-sectional diagram of electronic and optical component placement on a semiconductor substrate according to one embodiment of the principles described herein.

Referring now to FIG. 8, a cross-sectional diagram of an electro-optical system (800) fabricated on a semiconductor substrate (801) is shown. In the electro-optical system (800), a layer of electronic components (803) is fabricated on the semiconductor substrate (801). The layer of electronic components (803) may include transistors, resistors, inductors, capacitors, transmission lines, antennas, and any other electronic components (803) that may be required by a particular application.

An optical die (805) may be bonded to the layer of electronic components (803) with a bonding layer (807), such as an oxide that electrically insulates the optical die (805) from the layer of electronic components (803). A layer of thermally conductive material (809), such as a metal, diamond, or a semiconductor, may be disposed between the first layer of electronic components (803) and function as a heat spreader to diffuse heat generated by the electrical components (803) uniformly over a given surface area.

Trenches (811) formed in the optical die (805) may be used to substantially thermally isolate optical components, such as optical resonators (813), according to principles described above. Optical connectors (815, 817) may be used to route optical beams into and out of the optical die (805). Additional layers (not shown) may be deposited over the optical die (805) including, but not limited to, additional layers of electronic components, additional layers of optical components, additional bonding layers, additional heat spreading layers, and heat dissipation layers (e.g. heatsinks).

Figure 9:
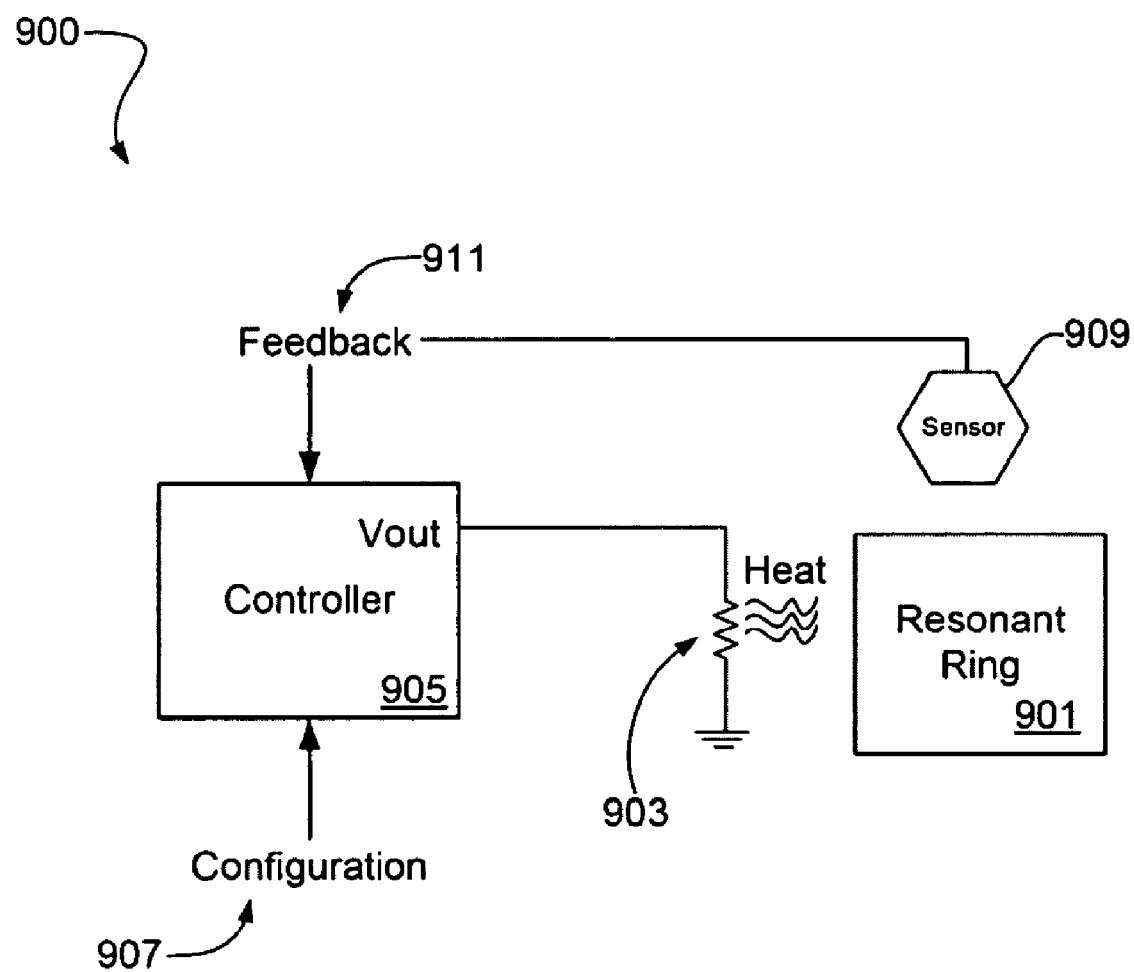
FIG. 9 is an electrical schematic of an illustrative optical system according to one embodiment of the principles described herein.

Referring now to FIG. 9, a block diagram is shown of an illustrative system (900) having a substantially thermally isolated optical resonator with heat tuning, consistent with principles described previously in the present specification. A heating element (903) of the present system (900) is modeled as a resistance. The heat generated by current flowing through the resistance of the heating element (903) may affect the optical properties of the resonant ring (901), specifically the resonant frequency, as has been described previously.

The current in the heating element (903) may be generated by an electronic controller (905). The generated current in the heating element (903) flows due to an output voltage (Vout) from the electronic controller (905) that is in electrical communication with the heating element (903). The electronic controller (905) may include one or more processing elements, such as microcontrollers, application specific integrated circuits (ASICs), and the like. The electronic controller (905) may be configured to run an algorithm that adjusts the current in the heating element (903) according to the particular optical needs of a specific implementation.

The electronic controller (905) may receive a configuration (907) that affects the way in which the resonant frequency of the resonant ring (901) is controlled, according to the particular needs of the consumer. The configuration (907) may be received directly through a user interface, or from another electronic component in communication with the electronic controller (905).

Additionally, the illustrative system (900) includes a sensor (909) configured to detect an attribute of the resonant ring (901) and provide feedback (911) to the controller (905). The feedback (911) may then be used by the controller in its specific algorithm to determine the management of the current generated in the heating element (903).

In the present example, the sensor (909) is shown as a temperature sensor which detects heat dissipated by the resonant ring (901). By measuring the temperature of the resonant ring (901), the approximate resonant frequency of the resonant ring (901) may be determined at the controller (905), and adjustments may be made to the current in the heating element (903) as needed.

In other embodiments, the sensor (909) may be an optical sensor that determines specific optical properties of the resonant ring (901) or an optical energy traveling through a tangential waveguide coupled to the resonant ring (901), such as the resonant frequency of the ring resonator or the wavelength of optical energy transmitted through the resonant ring (901) or tangential waveguide. In still other embodiments, the sensor (909) may be an electrical current sensor. The sensor (909) may be analog or digital, and a plurality of sensors may be used in some embodiments.

Illustrative Methods

Referring now to FIG. 10, a flowchart diagram of an illustrative method (1000) of selectively tuning a ring resonator is shown.

The method (1000) may include providing (step 1001) a substantially thermally isolated optical resonator having an optical waveguide arranged in a loop. A heating element is also provided (step 1003). The resonant frequency of the optical ring resonator may then be selectively altered (step 1005) by selectively passing current through the heating element.

Furthermore, in some embodiments the method (1000) may include dynamically receiving data from a sensor corresponding to the resonant frequency of the ring resonator and using the data in a feedback loop to tune the resonator to a desired resonant frequency.

What is claimed is:

1. An optical apparatus, comprising:
   a substrate comprising a layer of thermally insulating material disposed thereon;
   an optical resonator disposed on said layer of thermally insulating material; and
   a trench in said thermally insulating material disposed around at least a portion of said optical resonator;
   wherein said optical resonator is substantially thermally isolated from said substrate; and
   a layer of insulating material disposed protectively over said optical resonator and over said thermally insulating material underlying said optical resonator.

2. The optical apparatus of claim 1, wherein said layer of thermally insulating material under said optical resonator is undercut to form a thermally insulating post between said optical resonator and said substrate.

3. An optical apparatus, comprising:
   a substrate comprising a layer of thermally insulating material disposed thereon;
   an optical resonator disposed on said layer of thermally insulating material; and
   a trench in said thermally insulating material disposed around at least a portion of said optical resonator;
   wherein said optical resonator is substantially thermally isolated from said substrate; and
   wherein at least a portion of said layer of thermally insulating material is porous.

4. The optical apparatus of claim 1, further comprising a heating element configured to selectively heat said optical resonator, said heating element being disposed over said insulating layer.

5. The optical apparatus of claim 1, further comprising a heating element configured to selectively heat said optical sensor, wherein said heating element is disposed within said insulating layer and beneath said optical resonator.

6. The optical apparatus of claim 3, wherein said heating element comprises at least a portion of an optical modulator.

7. The optical apparatus of claim 1, wherein said optical resonator comprises at least one of the group consisting of: ring resonators, optical microrings, optical microdisks, and photonic crystal microcavities.

8. An optical apparatus, comprising:
   a substrate comprising a layer of thermally insulating material disposed thereon, wherein at least a portion of said layer of thermally insulating material is porous;
   an optical resonator disposed on said layer of thermally insulating material; and
   a trench in said thermally insulating material disposed around at least a portion of said optical resonator;
   wherein said optical resonator is substantially thermally isolated from said substrate; and
   further comprising:
   a heating element configured to selectively heat said optical resonator, said heating element being arranged concentric to said optical resonator; and
   a controller in electrical communication with said heating element; wherein said controller is configured to selectively tune a resonant frequency of said optical resonator by selectively controlling said heating element.

9. The optical apparatus of claim 8, wherein said controller is selected from at least one or more of the group consisting of: processors, microcontrollers, and application specific integrated circuits.

10. The optical apparatus of claim 8, further comprising a sensor in communication with said controller.

11. The optical apparatus of claim 10, wherein said sensor is selected from the group consisting of: temperature sensors, current sensors, optical sensors, and combinations thereof.

12. The optical apparatus of claim 10, wherein said controller is configured to selectively tune said resonant frequency of said optical resonator in accordance with feedback from said sensor.

13. The optical apparatus of claim 8, wherein said heating element comprises an electrical coil.

14. An optical apparatus, comprising:
   a substrate comprising a layer of thermally insulating material disposed thereon;
   an optical resonator disposed on said layer of thermally insulating material; and
   a trench in said thermally insulating material disposed around at least a portion of said optical resonator;
   wherein said optical resonator is substantially thermally isolated from said substrate; and
   further comprising:
   a heating element configured to selectively heat said optical resonator, said heating element being arranged concentric to said optical resonator; and
   a controller in electrical communication with said heating element; wherein said controller is configured to selectively tune a resonant frequency of said optical resonator by selectively controlling said heating element;
   wherein said heating element comprises at least a portion of an optical modulator.

15. The optical apparatus of claim 8, wherein said layer of thermally insulating material under said optical resonator is undercut to form a thermally insulating post between said optical resonator and a substrate.

16. The optical apparatus of claim 8, wherein said optical resonator comprises at least one of the group consisting of: ring resonators, optical microrings, optical microdisks, and photonic crystal microcavities.

17. The optical apparatus of claim 8, wherein said optical resonator is annular and said heating element is disposed concentrically inside said annular optical resonator.

18. The optical apparatus of claim 8, wherein said optical resonator is annular and said heating element is disposed concentrically outside said annular optical resonator.

19. The optical apparatus of claim 8, wherein said optical resonator is annular and said heating element is disposed concentrically above said annular optical resonator.

20. The optical apparatus of claim 19, further comprising a layer of electrically-insulating material disposed between the heating element and annular optical resonator.

* * * * *